United States Patent [19]

Whitehead et al.

[11] Patent Number: 5,026,259
[45] Date of Patent: Jun. 25, 1991

[54] MINIATURIZED PRESSURIZATION SYSTEM

[75] Inventors: John C. Whitehead, Davis, Calif.; Don G. Swink, Woodinville, Wash.

[73] Assignee: The United States of America as represented by the United States Department of Energy, Washington, D.C.

[21] Appl. No.: 550,280

[22] Filed: Jul. 9, 1990

[51] Int. Cl.⁵ .............................. F04B 9/08
[52] U.S. Cl. ............................ 417/379; 417/392; 417/401; 60/39.462
[58] Field of Search ............ 417/392, 401, 379, 382; 60/259, 39.462

[56] References Cited

U.S. PATENT DOCUMENTS

| 1,909,145 | 5/1933 | Berenbruch | 417/392 |
| 3,171,251 | 3/1965 | Pauli | 60/259 |
| 3,306,038 | 2/1967 | Ferriman | 60/259 |
| 3,408,817 | 11/1968 | Waltz | 60/259 |
| 3,427,808 | 2/1969 | Butcher | 417/379 |
| 3,479,818 | 11/1969 | Strobl | 60/259 |
| 3,516,251 | 6/1970 | Andrews | 60/259 |
| 3,839,863 | 10/1974 | Frazier | 417/401 |
| 4,258,546 | 3/1981 | Stratton | 60/259 |
| 4,342,543 | 8/1982 | Allen | 417/401 |
| 4,576,105 | 3/1986 | Erdmann | 114/333 |
| 4,726,184 | 2/1988 | Waddington | 244/322 |
| 4,762,293 | 8/1988 | Russell | 60/247 |
| 4,856,271 | 8/1989 | Burke | 60/39.462 |

Primary Examiner—Leonard E. Smith
Assistant Examiner—Peter Kurytnyk
Attorney, Agent, or Firm—Michael B. K. Lee; L. E. Garnahan; William R. Moser

[57] ABSTRACT

The invention uses a fluid stored at a low pressure and provides the fluid at a high pressure. The invention allows the low pressure fluid to flow to a fluid bore of a differential pump and from the pump to a fluid pressure regulator. After flowing through the regulator the fluid is converted to a gas which is directed to a gas bore of the differential pump. By controlling the flow of gas entering and being exhausted from the gas bore, the invention provides pressure to the fluid. By setting the regulator, the high pressure fluid can be set at predetermined values. Because the invention only needs a low pressure fluid, the inventive apparatus has a low mass, and therefore would be useful in rocket propulsion systems.

24 Claims, 2 Drawing Sheets

MINIATURIZED PRESSURIZATION SYSTEM

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

This invention relates to pressurization systems and liquid rocket propulsion systems, and particularly to those used for attitude control or maneuvering of small space vehicles or airborne vehicles where the requirement for thrust is intermittent rather than continuous, and must be available rapidly upon demand. This invention also relates to increasing performance of such propulsion systems, by way of eliminating inert mass from the propulsion system.

Previously, small liquid propulsion systems which provide intermittent thrust on demand were pressure fed propulsion systems in which the propellant stored in the propellant storage tanks is pressurized above the operating pressure of the engines. In such a pressure-fed system, a valve connects the propellant storage tank to the engine's propellant injector, which gives the capability for thrust on demand merely by opening the valve.

High-performance liquid propulsion systems which provide a high thrust-to-weight ratio and a high fraction of stored propellant relative to inert mass are pump-fed propulsion systems. The use of pumps permits the tank pressure to be low, so the storage tanks can be lightweight. In pump-fed systems, it is typical to use rotating turbomachinery pumps which are driven by gases generated from reacted propellant. This is well-suited to propulsion systems requiring continuous, steady thrust, such as launch vehicles, for example. A limitation is that a requirement for intermittent thrust-on-demand cannot be met due to the time required to start and stop the turbo pumps and flows in the system. Thus, turbo-pump-fed propulsion systems are useful for producing thrust continuously.

SUMMARY OF THE INVENTION

It is an object of the invention to provide a light weight Propulsion system with the capability of thrust-on-demand.

It is another object of the invention to provide a light weight system that supplies a high pressure gas.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The present invention provides means to obtain advantages of the two different prior art propulsion systems described above, without the disadvantages of either. In particular, the present invention permits construction of small fluid propulsion systems which have high performance along with the capability for thrust-on-demand with substantially no delay.

The invention uses a fluid stored in a fluid storage tank at a low pressure. The fluid is fed into a smaller bore of a differential pump. Since this smaller bore is filled with the fluid it is called a fluid bore. The fluid displaces a free piston, pushing it into a larger bore of the differential pump. The fluid flows out of the pump and through a fluid pressure regulator to a gas generator where the fluid is changed to a hotter gas and stored. Some of the gas is fed into the larger bore of the differential pump, which is called a gas bore since it is filled with a gas. The gas pushes the piston into the fluid bore increasing the pressure of the system. This system is used to create a first order instability which causes the pressure to quickly increase to a level set by the fluid pressure regulator.

DETAILED DESCRIPTION OF THE INVENTION

Figure 1:
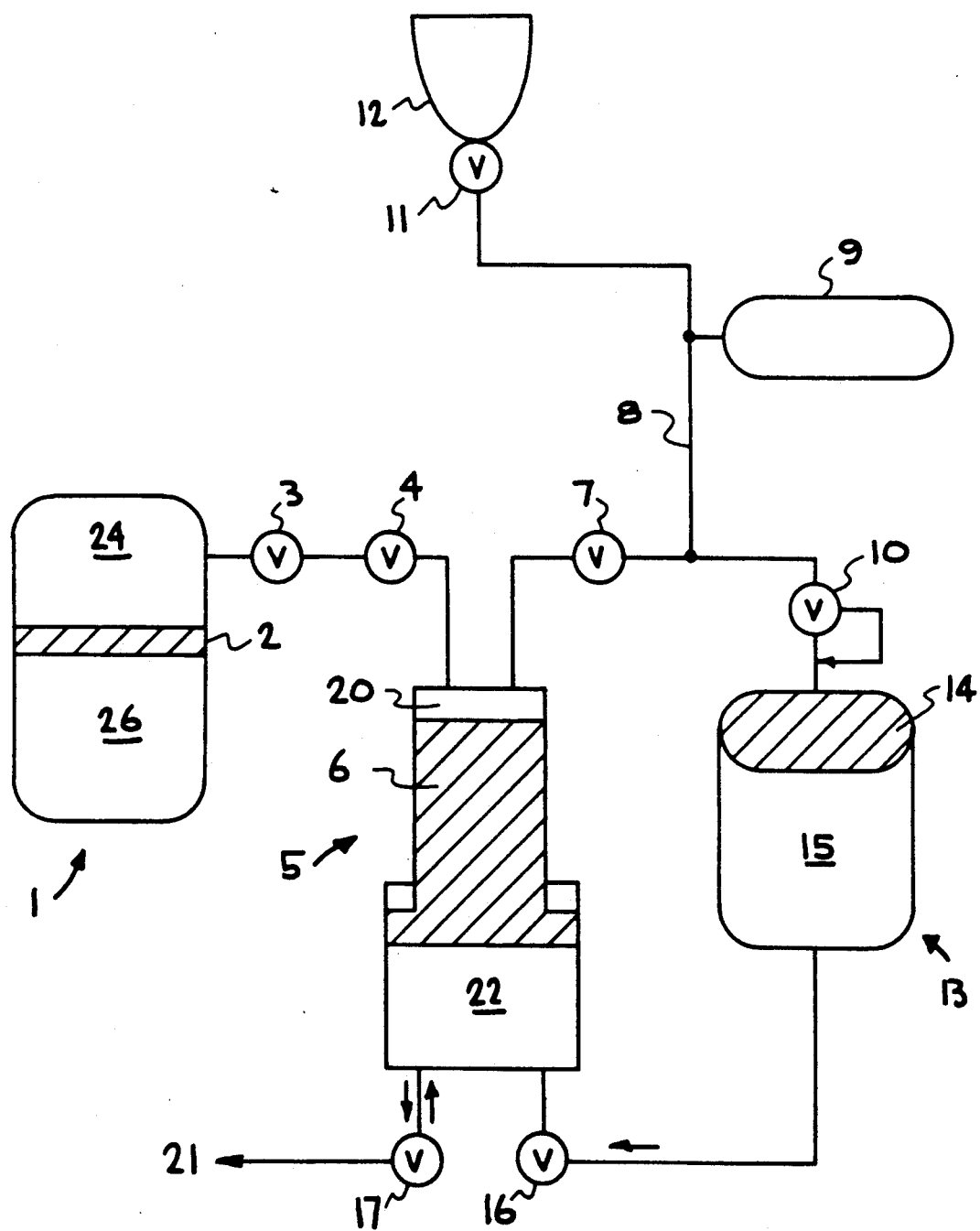
FIG. 1 illustrates a rocket propulsion system utilizing an embodiment of the invention which has a single storage tank and a single pump.

FIG. 1 illustrates an embodiment of the invention using a hydrazine monopropellant. A tank 1 has a first chamber 24 and a second chamber 26, wherein the chambers are separated and defined by a piston 2. The propellant storage tank 1 contains fluid propellant in the first chamber 24 and a pressurant fluid in the second chamber 26. In this embodiment, the fluid in the first chamber 24 is a hydrazine monopropellant liquid and the pressurant in the second chamber 26 is a mixture of propane and isobutane in liquid-vapor equilibrium, which will maintain a pressure between 50 and 150 psi over the operating temperature of this embodiment. This pressurant will apply pressure to the movable piston 2, thus keeping the hydrazine pressurized to between 50 and 150 psi over an appropriate operating temperature range. An actuating valve 3 is connected to the fluid outlet of the tank 1, which is in turn connected to a check valve 4 which connects to a pump 5. The pump 5 consists of two cylindrical bores 20, 22 of differing diameters containing a differential piston 6, such that fluid in the smaller bore 20 of the pump 5 is separated from gas to be introduced into the larger bore 22. A second check valve 7 connects the outlet of the smaller bore 20 of the pump 5 to a high pressure fluid manifold 8. Note that the check valves 4 and 7 may be built into the pump 5.

Connected to the high pressure manifold 8 are an accumulator 9, fluid pressure regulator 10, and a thrust control valve 11 which is in turn connected to a rocket engine 12. The outlet of the regulator 10 is connected to a gas generator 13, which is a catalyst 14, which in this embodiment comprises ceramic beads coated with iridium which is marketed as "Shell 405," in series with a hot gas storage plenum 15. A pump intake valve 16, which in this embodiment is a solenoid controlled valve, connects the hot gas storage plenum 15 to the larger bore 22 of the pump 5. A pump exhaust valve 17 is connected between the larger bore 22 of the pump 5 and an exhaust system 21. The propellant storage tank 1 is typically many times larger than the remainder of the propulsion system.

In order to begin operation, the actuation valve 3 is opened, and fluid flows through both the actuation valve 3 and the check valve 4, and fills the smaller bore 20 (fluid bore) of the pump 5, thereby driving the piston 6 as far as possible into the larger bore 22 of the pump 5. Fluid propellant also flows through the check valve 7 and into the high pressure manifold 8. At this time during system startup, the high pressure manifold 8 is still only at the pressure of the storage tank 1. Fluid propellant at this low pressure then flows through the regulator 10 and into the gas generator 13. Fluid in contact with the catalyst 14 decomposes and fills the plenum 15 with hot gas at approximately the same pressure as the propellant in the storage tank 1. In this embodiment the hydrazine decomposes by the reaction $3N_2H_4 \rightarrow N_2 + 4NH_3$, which is highly exothermic. Endothermic ammonia dissociation $4NH_3 \rightarrow 2xN_2 + 6xH_2 + 4(1-x)NH_3$, is also catalyzed, where x is the fraction of ammonia which is dissociated.

To initiate high pressure operation, the pump intake valve 16 must be opened, at which time hot gas flows into the larger bore 22 (gas bore) of the pump 5, driving the piston 6 further into the gas bore 20 of the pump 5. Although the pressure is initially the same in the two bores of the pump, the differential piston 6 gives the gas pressure an advantage over the fluid pressure. As the piston 6 moves, a small amount of fluid flows upstream toward the storage tank 1, thereby closing the check valve 4. Further motion of the piston 6 results in further fluid flow to the manifold 8 and through the regulator 10, into the gas generator 13, which increases the pressure in the plenum 15. Essentially, the closed loop through the pump 5, the check valve 7, the high pressure manifold 8, the fluid pressure regulator 10, the gas generator 13, the intake valve 16 and back to the pump 5 is a first order instability due to the pressure amplification of the pump 5 and the energy input from the reaction in the catalyst 14. In a very short time, the pressure in the manifold 8 and associated accumulator 9 rises above the set pressure of the regulator 10, which closes, preventing further flow or pressure increase. Initiation of system operation is now complete, and propellant may be withdrawn at high pressure from the manifold 8, for example by opening the valve 11 and obtaining thrust from the engine 12. One feature of the invention is that the pressure in the manifold 8 may be set arbitrarily higher than the pressure in the propellant storage tank 1, since the maximum pressure in the manifold 8 is the product of the set pressure of the regulator 10 and the pressure amplification factor of the pump 5.

As propellant is withdrawn from the manifold 8 for use in the engine 12, the piston 6 will reach full stroke, at which time the intake valve 16 must be closed and the exhaust valve 17 must be opened to refill the fluid bore 20 of the pump 5 by venting exhaust from the gas bore 22 to an exhaust system 21. In practice, valves 16 and 17 may be parts of a single three-way valve, which is, for example an electrically actuated solenoid valve receiving a continuous pulse train to permit periodic cycling of the piston 6 within the pump 5. As the piston reaches the end of its pumping stroke, the pressure in the manifold 8 begins to fall, so fluid flows from the accumulator 9, thereby maintaining the pressure in the manifold 8 until the pump 5 refills. Pump refill occurs after the exhaust valve 17 is opened, which exhausts the gas in the gas bore 22 of the pump 5, permitting the piston 6 to return toward the gas end 22. During refill, the check valve 7 closes, and the check valve 4 opens, permitting refill of the fluid bore 20 of the pump 5 from the propellant storage tank 1.

If the pump 5 is not actuated by opening the intake valve 16, the pressure in the manifold 8 will return to the same pressure level present in the propellant storage tank 1, thereby making it possible to operate the system at either of two different pressures, in order to obtain a wide range of thrust capabilities, for example. By appropriate control of the pump valves 16 and 17, the pressure in the manifold 8 may be switched freely back and forth from low pressure to high pressure if desired.

Figure 2:
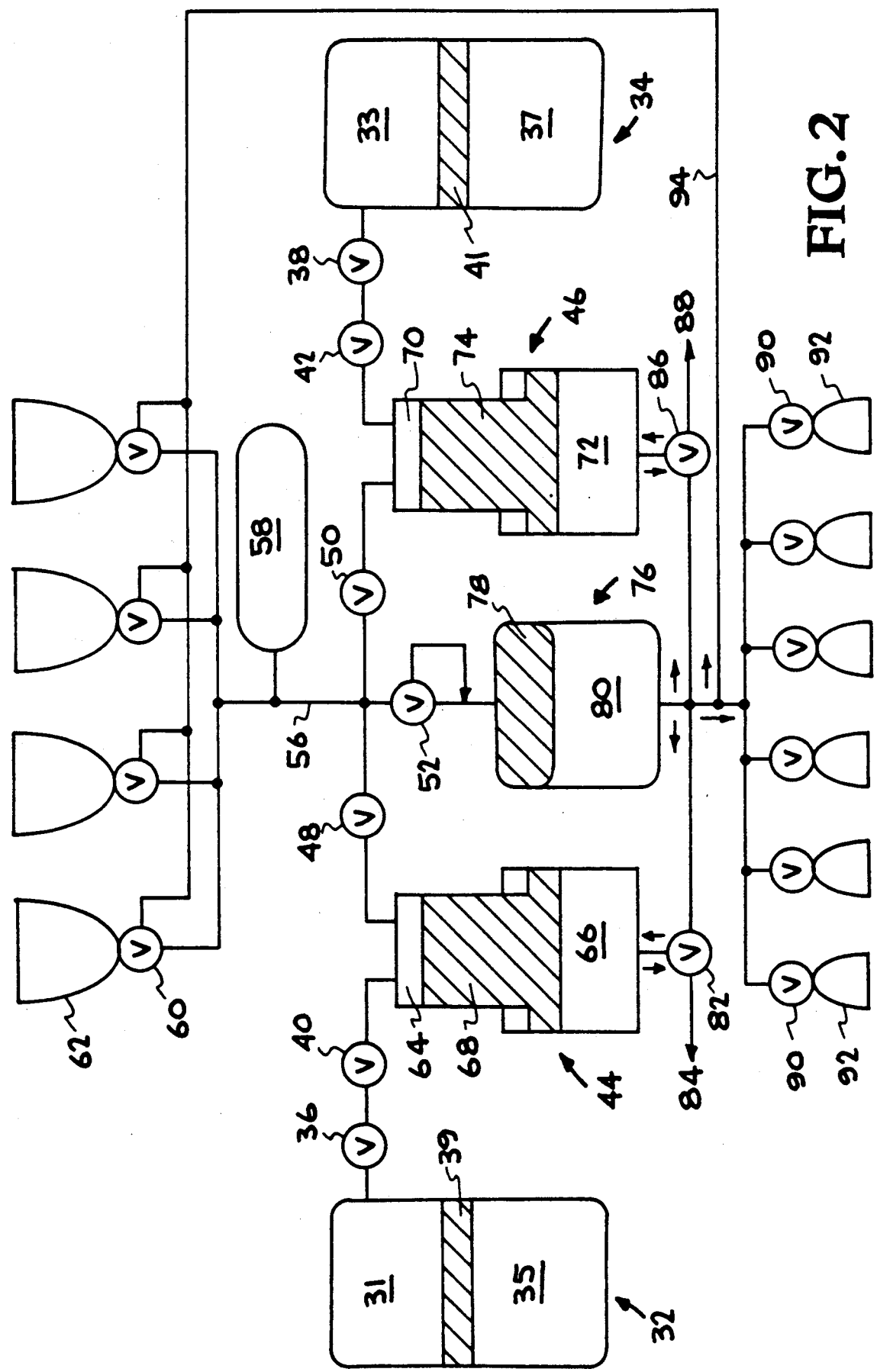
FIG. 2 illustrates a rocket propulsion system utilizing another embodiment of the invention which has two storage tanks and two pumps.

FIG. 2 illustrates another embodiment of the invention. This embodiment has two propellant storage tanks 32, 34, which are designated as a first propellant tank 32 and a second propellant tank 34. These propellant tanks 32, 34 have a first chamber 31, 33 and a second chamber 35, 37 and a piston 39, 41 separating the chambers. The first propellant storage tank 32 has an actuation valve 36 and a check valve 40. The check valve 40 of the first storage tank 32 is connected to a first differential pump 44. The first differential pump 44 has a fluid bore 64, a gas bore 66 which has a larger diameter than the fluid bore 64, and a differential piston 68. The check valve 40 of the first storage tank is connected to the fluid bore 64 of the first differential pump 44. A check valve 48 for the first differential pump 44 is connected between the fluid bore 64 of the first differential pump 44 and a common high pressure manifold 56. The second propellant storage tank 34 has an actuation valve 38 and a check valve 42. The check valve 42 of the second storage tank 32 is connected to a second differential pump 46. The second differential pump 46 has a fluid bore 70, a gas bore 72 which has a larger diameter than the fluid bore 70, and a differential piston 74. The check valve 42 of the second storage tank is connected to the fluid bore 70 of the second differential pump 46. A check valve 50 for the second differential pump 46 is connected between the fluid bore 70 of the second differential pump 46 and the common high pressure manifold 56. Connected to the high pressure manifold 56 is a fluid pressure regulator 52, an accumulator 58 and a first plurality of thrust control valves 60 each connected to rocket engines 62. The regulator 52 is connected to a gas generator 76 which comprises a catalyst 78 and a hot gas storage plenum 80. A first three way valve 82 connects the hot gas storage plenum 80 to the gas bore 66 of the first differential pump 44 and an exhaust system 84. A second three way valve 86 connects the hot gas storage plenum 80 to the gas bore 72 of the second differential pump 46 and an exhaust system 88. The first three way valve 82 and the second three way valve 86 function as intake/exhaust valves. The hot gas storage plenum 80 is also directly connected to a second plurality of thrust control valves 90 each connected to rocket engines 92. The hot gas storage plenum 80 may also be connected to the first plurality of thruster control valves 60.

In order to begin operation, the actuation valve 36 for the first propellant tank 32 is opened, and fluid flows through both the actuation valve 36 and the check valve 40, and fills the fluid bore 64 of the first differential pump 44, thereby driving the piston 68 as far as possible into the gas bore 66 of the pump 44. Liquid propellant also flows through the first pump check valve 48 and to the common regulator 52. Liquid propellant at this low pressure then flows through the regulator 52 and into the gas generator 76. The liquid hydrazine, which is the propellant in both storage tanks in this embodiment, in contact with the catalyst 78 decomposes and fills the plenum 80 with hot gas initially at approximately the same pressure as the propellant in the first storage tank 32.

To initiate high pressure operation, the pump intake/exhaust valve 82 must be set to allow the hot gas to flow into the gas bore 66 of the first pump 44, driving the piston 68 toward the fluid end 64 of the pump 44. Although the pressure is initially the same in the two bores of the pump, the differential piston 68 gives the gas pressure an advantage over the fluid pressure. As the piston 68 moves, a small amount of fluid flows upstream toward the first storage tank 32, thereby closing the check valve 40. Further motion of the piston 68 results in further fluid flow through the regulator 52, into the gas generator 76, which increases the pressure in the plenum 80. Essentially, the closed loop through the first differential pump 44, the first pump check valve 48, the high pressure manifold 56, the fluid pressure regulator 52, the gas generator 76, the intake/exhaust valve for the first pump 82 and back to the first pump 44 is a first order instability due to the pressure amplification of the first pump 44 and the energy input from the reaction in the catalyst 78. The positive pressure from the first pump 44 causes a flow through the check valve for the first pump 48 causing a pressure in the high pressure manifold 56. In a very short time, the pressure in the manifold 56 and associated accumulator 58 rises above the set pressure of the regulator 52, which closes, preventing further flow or pressure increase. Initiation of system operation is now complete, and propellant may be withdrawn at high pressure from the manifold 56, for example by opening the valves 60 and obtaining thrust from the engines 62.

As propellant is withdrawn from the manifold 56 for use in the engines 62, the piston 68 will reach full stroke, at which time the three way intake/exhaust valve 84 must be set to vent the gas from the gas bore 66 of the first differential pump 44 to the exhaust 84 and to prevent gas from the hot gas plenum from entering the gas bore 66, allowing fluid from the first propellant storage tank 32 to refill the fluid bore 64 and to push the piston 68 into the gas bore 66. As the piston 68 reaches the end of its pumping stroke, the pressure in the manifold 56 begins to fall, so fluid flows from the accumulator 58, thereby maintaining the pressure in the manifold 56.

During the refill of the fluid bore 64 of the first differential pump, the second differential pump 46 provides pressure. Before the refill cycle begins for the first differential pump 44, with the actuation valve 38 for the second propellant tank 34 opened, the intake/exhaust valve 86 for the second pump 46 is set to vent gas from the gas bore 72 of the second pump 46 to the exhaust system 88 and to prevent hot gas from the hot gas plenum 80 from entering the gas bore 72, so that the fluid bore 70 of the second differential pump 46 is filled so that the piston 74 is as far as possible into the gas bore 72 of the pump 46.

As the refill begins for the fluid bore 64 of the first pump 44, intake/exhaust valve 86 of the second pump 46 is set to allow the hot gas from the plenum 80 to flow into the gas bore 72 of the second pump 46, driving the piston 74 toward the fluid end 70 of the pump 46. As the piston 74 moves, a small amount of fluid flows upstream toward the second storage tank 34, thereby closing the check valve 42. Further motion of the piston 74 results in further fluid flow through the regulator 52, into the gas generator 76, which increases the pressure in the plenum 80. Essentially, the closed loop through the second pump 46, the second pump check valve 50, the common high pressure manifold 56, the common fluid pressure regulator 52, the gas generator 76, the second pump intake/exhaust valve 86 and back to the second pump 46 is a first order instability due to the pressure amplification of the second pump 46 and the energy input from the reaction in the catalyst 78. The positive pressure from the second pump 46 causes a pressure in the high pressure manifold 56. During the high pressure operation, the pressure in the manifold 56 and associated accumulator 58 is maintained above the set pressure of the regulator 52, which passes just enough fluid to maintain a hot gas supply in the plenum 80, at or near the set pressure of the regulator 52.

As propellant is withdrawn from the manifold 56 for use in the engines 62, the piston 74 will reach full stroke, at which time the three way intake/exhaust valve 86 must be set to vent the gas from the gas bore 72 of the second differential pump 46 to the exhaust 88 and to prevent gas from the hot gas plenum from entering the gas bore 72, allowing liquid from the second propellant storage tank 34 to refill the fluid bore 70 and to push the piston 74 into the gas bore 72.

One advantage of having two pumps is that by operating them alternately, continuous steady flow of propellant into the manifold 56 becomes possible, which permits steady continuous thrust from the engine 62 without requiring an unduly large accumulator 58.

Hot gas from the hot gas plenum 80 can flow to thrust valves 90 to provide thrust from engines 92, which may be used to steer the device. Hot gas from hot gas plenum 80 can also flow through an additional manifold 94 to operate pilot stages of thrust valves 60 to provide primary thrust for the system. It is possible to utilize some of the pressurized hot gas from the gas generator 80 for other auxiliary functions.

Similarly, the high pressure fluid available in the manifold 56 may be used for a number of functions such as actuating multiple engines, or for feeding a gas generator significantly larger than the gas generator 76 in this embodiment, if for example it is desired to use the system as a lightweight inflation or pressurization system.

In another alternate embodiment, it would be possible to use the invention in a bipropellant propulsion system, i.e. with a fuel and oxidizer, which would require separate storage tanks and separate pumps. This would be similar to the embodiment illustrated in FIG. 2, with the first propellant storage tank holding a fuel and the second propellant storage tank holding an oxidizer. This embodiment would provide separate high pressure fluid manifolds and separate pressure regulators for the fuel and oxidizer. In addition the fuel and oxidizer may be gas or liquid fluids.

Any number of tanks and pumps may be used, all of which deliver propellant. A particular advantage of doing so is that there is the capability of independent control of propellant withdrawal selection from among the various storage tanks. If the system is used for a moving vehicle, for example, this control capability permits management of the center of gravity of the vehicle.

If it is desired to shut the system down and restart at a significantly later time, the actuation valve at the tank outlet should be an on-off or latching valve with a leak-tight seal. If the system is to be used until the storage tanks are empty in a short period of time, the actuation valve needs to open only once without being reclosable, e.g. a burst disc which is ruptured by a pyrotechnically actuated device would be appropriate.

In another embodiment of the invention, a gas pressure regulator is placed after the hot gas plenum, to replace the fluid pressure regulator before the hot gas plenum. What is important is that a regulator is used in series with the hot gas plenum and differential pump.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for providing higher pressure for a fluid stored at a low pressure, comprising the steps of:
   storing the fluid at the low pressure in a low pressure fluid storage tank;
   venting the fluid from the low pressure fluid storage tank into a fluid bore of a differential pump;
   moving a piston by the fluid in the fluid bore of the differential pump, so that the piston is being moved out of the fluid bore of the differential pump into a gas bore of the differential pump;
   venting the fluid from the fluid bore of the differential pump to a gas generator;
   transforming the fluid to a gas in the gas generator;
   venting the gas from the gas generator to the gas bore of the differential pump;
   driving the piston from the gas bore into the fluid bore of the differential pump;
   stopping the flow of gas from the gas generator to the gas bore once the piston has reached a full stroke;
   venting the gas from the gas bore to an exhaust system; and
   regulating the pressure of the gas.

2. A method as claimed in claim 1, further comprising the steps of:
   preventing the fluid from flowing from the fluid bore of the pump to the fluid storage tank;
   venting the fluid from the fluid bore of the pump to a rocket engine;
   controlling the flow of the fluid from the fluid bore of the pump to the rocket engine; and
   accumulating some of the fluid vented from the fluid bore of the pump.

3. A method as claimed in claim 2, wherein the step of transforming the fluid to a gas comprises the step of exposing the fluid to a catalyst.

4. A method as claimed in claim 2, further comprising the steps of:
   storing a second fluid in a second low pressure fluid storage tank;
   venting the second fluid from the second low pressure fluid storage tank into a fluid bore of a second differential pump;
   moving a second piston by the second fluid in the fluid bore of the second differential pump, so that the piston is being moved out of the fluid bore of the second differential pump into a gas bore of the second differential pump;
   venting the second fluid from the fluid bore of the second differential pump to the gas generator;
   transforming the second fluid to a gas in the gas generator;
   venting the gas from the gas generator to a gas bore of the second differential pump;
   driving the second piston from the gas bore into the fluid bore of the second differential pump;
   stopping the flow of gas from the gas generator to the gas bore of the second differential pump once the second piston has reached a full stroke; and
   venting the gas from the gas bore of the second differential pump to an exhaust system.

5. A method as claimed in claim 4, further comprising the steps of:
   sensing comparative withdrawal rates of the first and second fluids from the first and second fluid storage tanks; and
   controlling the comparative withdrawal rates of the first and second fluids from the first and second fluid storage tanks.

6. A method as claimed in claim 4, wherein the venting of the second fluid to the gas generator is accomplished by venting the fluid through the means for regulating the pressure.

7. A method as claimed in claim 5, wherein the first fluid is a fuel and the second fluid is an oxidizer.

8. An apparatus for providing a higher pressure output for a fluid stored at a low pressure, comprising:
   a first fluid storage tank with an outlet;
   means for pressurizing the first fluid storage tank to the low pressure;
   a first gas-driven free-piston fluid pump with a fluid bore with an inlet and outlet, a gas bore with a first opening, and a piston, wherein the inlet of the fluid bore is connected to the outlet of the fluid storage tank;
   a gas generator with an inlet and outlet, wherein the inlet of the gas generator is connected to the outlet of the fluid bore of the first pump;
   means for controlling the intaking of gas into the gas bore of the pump, wherein the means is connected between the outlet of the gas generator and the first opening of the gas bore of the first pump;
   means for regulating the pressure of the gas available to the means for controlling the intaking of gas into the pump;
   means for controlling the exhausting of gas from the gas bore of the first pump; and
   means for opening the means for controlling intaking and closing the means for controlling exhausting in order to increase pressure in the gas bore of the pump, and for closing the means for controlling intaking and opening the means for controlling exhausting in order to diminish pressure in the gas bore of the pump.

9. An apparatus as claimed in claim 8, further comprising, a first check valve which allows the fluid to flow from the storage tank to the fluid bore of the pump, but prevents fluid from flowing from the fluid bore of the pump to the storage tank.

10. An apparatus as claimed in claim 9, further comprising a second check valve which allows the flow of fluid from the fluid bore of the pump to the gas generator, but does not allow the flow of fluid from the gas generator to the fluid bore of the pump.

11. An apparatus as claimed in claim 10, wherein the first pump is a differential pump wherein the gas bore has a larger cross-sectional area than the fluid bore and wherein when the fluid bore fills with fluid it pushes the piston into the gas bore and when the gas bore fills with gas it pushes the piston into the fluid bore.

12. An apparatus as claimed in claim 11, further comprising, a high pressure manifold connected between the inlet of the gas generator and the outlet of the fluid bore of the pump.

13. An apparatus as claimed, in claim 11, wherein the means for regulating pressure is a fluid pressure regulator connected between the outlet of the fluid bore of the first pump and the inlet of the gas generator and wherein the pressure regulator allows the flow of fluid to the gas generator when the pressure at the regulator is below a set pressure and wherein the pressure regulator restricts the flow of fluid to the gas generator when the pressure at the regulator is above a set pressure.

14. An apparatus as claimed, in claim 11, wherein the means for regulating pressure is a gas pressure regulator connected between the outlet of the gas generator and means for controlling intaking and wherein the pressure regulator allows the flow of gas from the gas generator when the pressure at the regulator is below a set pressure and wherein the pressure regulator restricts the flow of gas from the gas generator when the pressure at the regulator is above a set pressure.

15. An apparatus as claimed in claim 12, wherein the high pressure manifold has an outlet for venting pressure.

16. An apparatus as claimed in claim 12, wherein the gas generator comprises a catalyst which causes the fluid to become a hot gas, and a hot gas plenum for storing the gas.

17. An apparatus as claimed in claim 12, further comprising:
 a second fluid storage tank with an outlet;
 means for pressurizing the second fluid storage tank to the low pressure;
 a second gas-driven free-piston fluid pump with a fluid bore with an inlet and outlet, a gas bore with a first opening, and a piston, wherein the inlet for the fluid bore is connected to the outlet of the fluid storage tank, wherein the outlet of the fluid bore of the second pump is connected to the inlet of the gas generator;
 means for controlling the intaking of gas from the gas generator to the gas bore of the second pump connected between the outlet of the gas generator and the first opening of the gas bore of the second pump;
 means for controlling the exhausting of gas from the gas bore of the second pump; and
 means for opening the means for controlling intaking and closing the means for controlling exhausting in order to increase pressure in the gas bore of the second pump, and for closing the means for controlling intaking and opening the means for controlling exhausting in order to diminish pressure in the gas bore of the second pump.

18. An apparatus as claimed, in claim 12, further comprising, means for using gas directly from the gas generator.

19. An apparatus as claimed in claim 12, wherein the fluid is hydrazine.

20. An apparatus as claimed in claim 15, further comprising:
 a thrust control valve with an inlet connected to the outlet of the high pressure manifold and an outlet; and
 a rocket engine connected to the outlet of the thrust control valve.

21. An apparatus as claimed in claim 20, further comprising, an accumulator which stores fluid in the high pressure manifold.

22. An apparatus as claimed in claim 17, further comprising:
 means for sensing unequal withdrawal of propellant from among the plurality of fluid storage tanks; and
 means for controlling the operation of the pumps to control the differential withdrawal of propellant from among the plurality of fluid storage tanks.

23. An apparatus as claimed in claim 17, wherein the fluid in the first storage tank is a fuel and the fluid in the second storage tank is an oxidizer.

24. An apparatus as claimed in claim 17, wherein the outlet of the fluid bore of the first pump and the outlet of the fluid bore of the second pump are connected to the inlet of the gas generator through the means for regulating the pressure.

* * * * *